United States Patent
Nakamura et al.

(10) Patent No.: US 11,940,458 B2
(45) Date of Patent: Mar. 26, 2024

(54) MEASUREMENT TOOL FOR COLLECTING BODILY SAMPLES WITH IMPROVED MEASUREMENT PRECISION

(71) Applicant: SEKISUI CHEMICAL CO., LTD., Osaka (JP)

(72) Inventors: Tsutomu Nakamura, Osaka (JP); Kazuhiko Imamura, Osaka (JP); Nobuhiko Inui, Saitama (JP); Ryousuke Takahashi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 467 days.

(21) Appl. No.: 17/277,463

(22) PCT Filed: Nov. 21, 2019

(86) PCT No.: PCT/JP2019/045560
§ 371 (c)(1),
(2) Date: Mar. 18, 2021

(87) PCT Pub. No.: WO2020/110877
PCT Pub. Date: Jun. 4, 2020

(65) Prior Publication Data
US 2021/0263059 A1  Aug. 26, 2021

(30) Foreign Application Priority Data
Nov. 30, 2018 (JP) ................. 2018-224522

(51) Int. Cl.
*G01N 1/00* (2006.01)
*G01N 35/08* (2006.01)

(52) U.S. Cl.
CPC ............. *G01N 35/08* (2013.01); *G01N 1/00* (2013.01); *G01N 2001/002* (2013.01)

(58) Field of Classification Search
None
See application file for complete search history.

(56) References Cited

U.S. PATENT DOCUMENTS 4,868,129 A  9/1989 Gibbons et al.
5,104,813 A  4/1992 Besemer et al.
(Continued)

FOREIGN PATENT DOCUMENTS

JP  2005-218677  8/2005
JP  2018-36256  3/2018

OTHER PUBLICATIONS

International Preliminary Report on Patentability and Written Opinion of the International Searching Authority dated May 25, 2021 in International (PCT) Application No. PCT/JP2019/045560.

(Continued)

*Primary Examiner* — Brandi N Hopkins
*Assistant Examiner* — Nigel H Plumb
(74) *Attorney, Agent, or Firm* — WENDEROTH, LIND & PONACK, L.L.P.

(57) ABSTRACT

A measurement tool includes: a measurement tool body including a sample collection unit for collecting a liquid sample by a capillary phenomenon, and a liquid feed channel; and a lid body attachable to and detachable from the measurement tool body. The liquid feed channel includes an upstream side channel and a downstream side channel. A space is defined, into which an upstream side end of the sample collection unit and a downstream side end of the upstream side channel open, when the lid body is attached to the measurement tool body. The downstream side channel is connected to a downstream side end of the sample collection unit. The space is open when the lid body is separated from the measurement tool body, and the space is closed and the upstream side channel and the sample col- (Continued)

lection unit are connected when the lid body is attached to the measurement tool body.

14 Claims, 4 Drawing Sheets

(56) References Cited

U.S. PATENT DOCUMENTS

| | | |
|---|---|---|
| 5,230,866 A | 7/1993 | Shartle et al. |
| 2015/0111239 A1 | 4/2015 | Collins et al. |
| 2018/0015453 A1* | 1/2018 | Wright .................... B01L 3/502 |
| 2018/0056290 A1 | 3/2018 | Xu et al. |
| 2018/0185841 A1* | 7/2018 | Weber ............... B01L 3/502715 |

OTHER PUBLICATIONS

Extended European Search Report dated Aug. 26, 2022 in corresponding European Patent Application No. 19889273.9.
International Search Report dated Jan. 21, 2020 in International (PCT) Application No. PCT/JP2019/045560.
Office Action dated Jan. 2, 2024 in Chinese Patent Application No. 201980038494.3.

* cited by examiner

[FIG. 1]
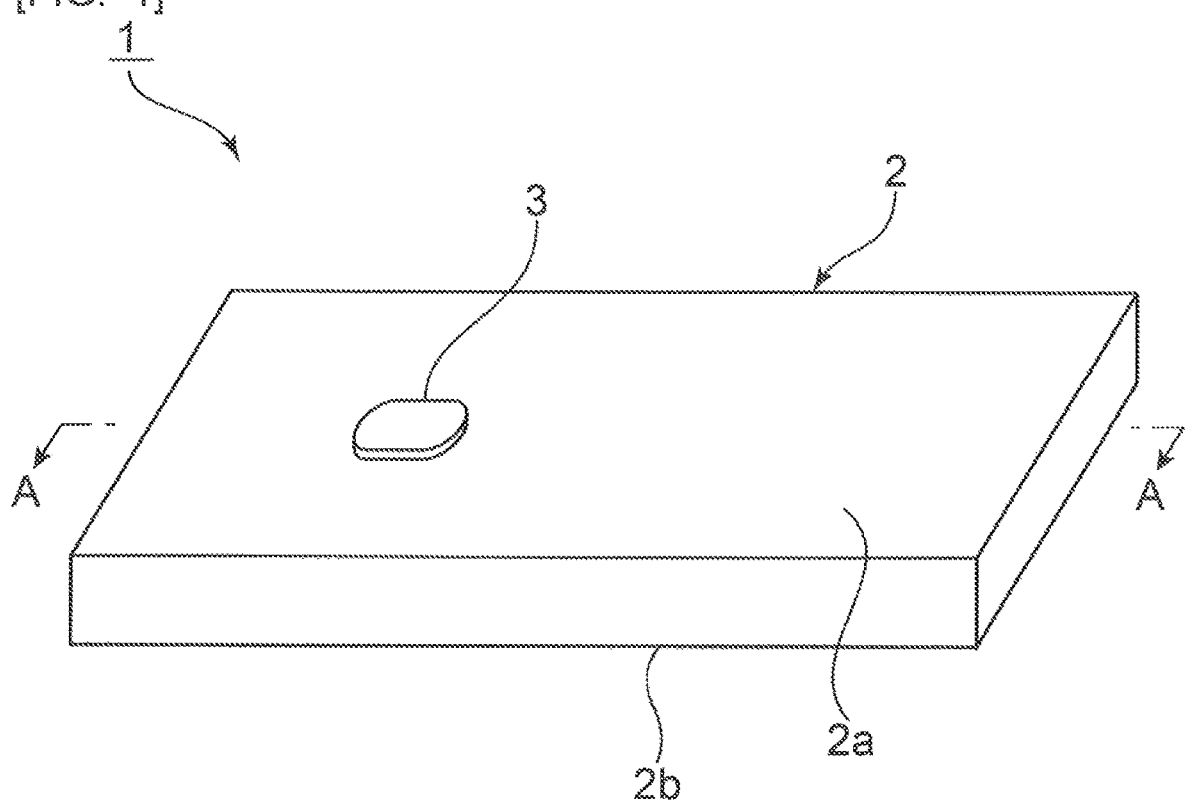
[FIG. 2]
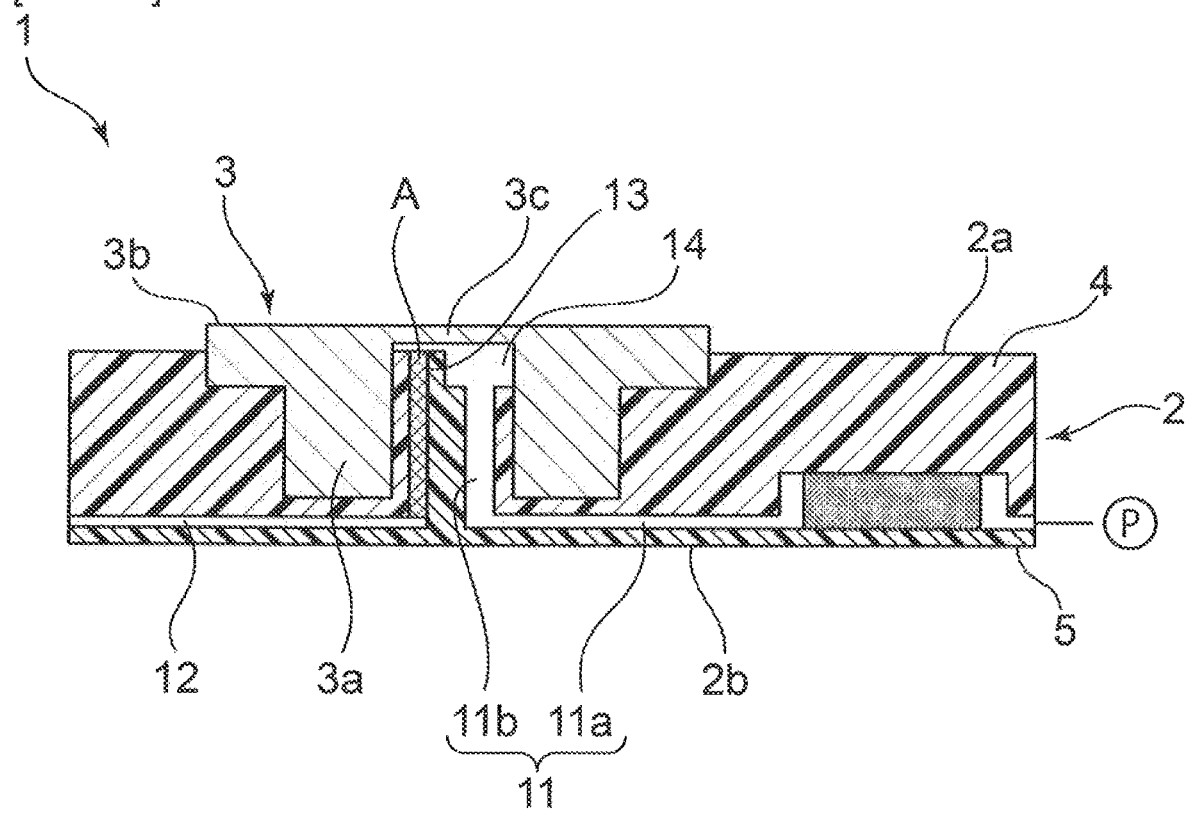

[FIG. 3]
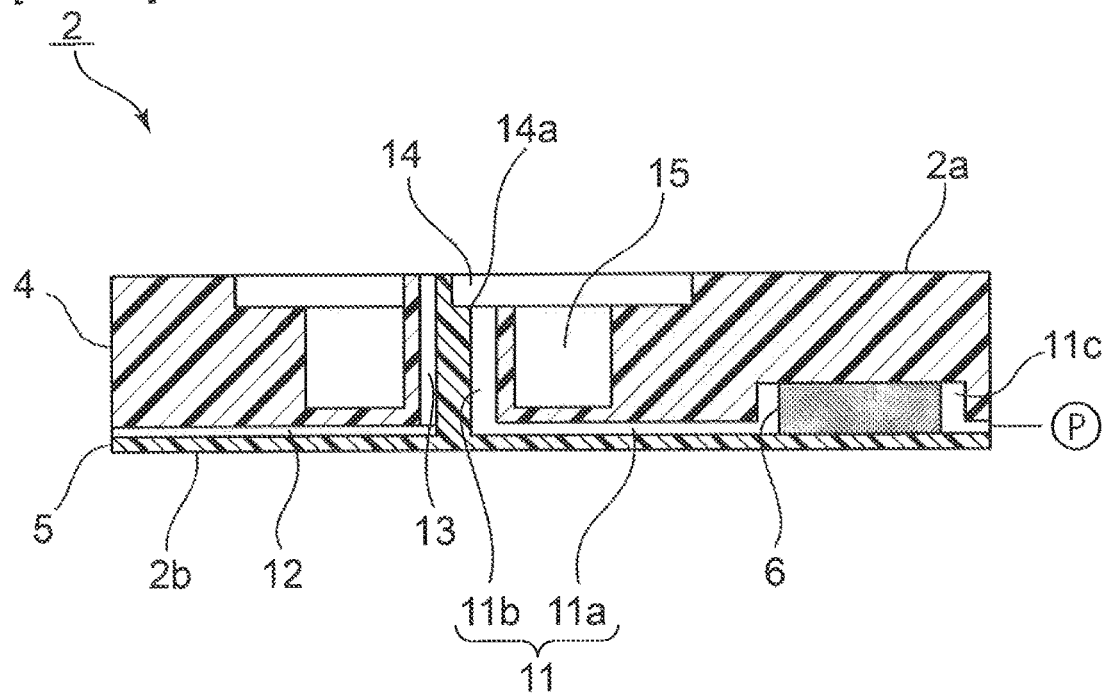
[FIG. 4]
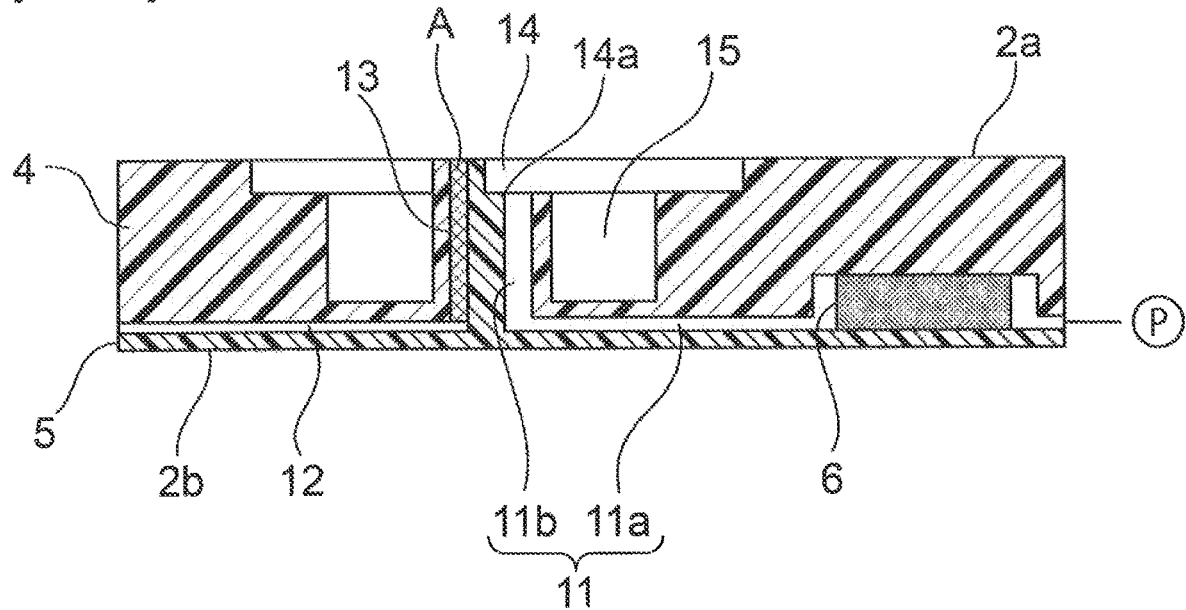

[FIG. 5]
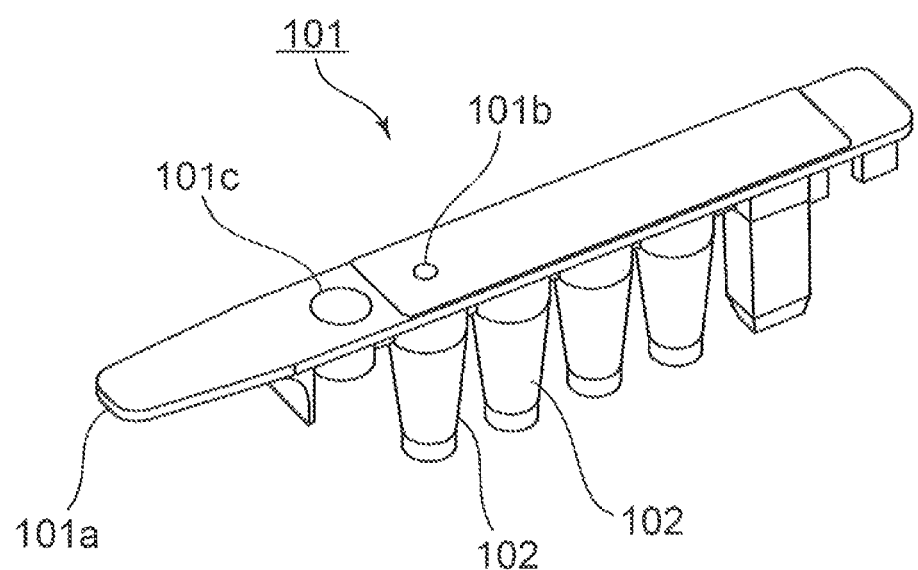

[FIG. 6]
(a)
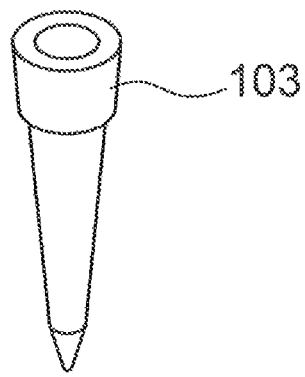
(b)

… (1)

MEASUREMENT TOOL FOR COLLECTING BODILY SAMPLES WITH IMPROVED MEASUREMENT PRECISION

TECHNICAL FIELD

The present invention relates to a measurement tool for collecting a liquid sample using a capillary phenomenon and using the same for various measurements, and a liquid feeding method in the measurement tool.

BACKGROUND ART

JP 2005-218677 A discloses a blood quantitative collection kit capable of collecting a minute amount of blood. This blood quantitative collection kit includes a flat plate-shaped base portion and a capillary portion. In the capillary portion, blood is collected by utilizing a capillary phenomenon. Next, the capillary portion is connected to the base portion, and the blood is injected into the base portion. A fixed amount of blood is collected in the base portion.

SUMMARY OF THE INVENTION

Problems to be Solved by the Invention

The blood quantitative collection kit disclosed in JP 2005-218677 A may quantitatively collect the blood in the base portion, but thereafter, the blood must be taken out from the base portion for analysis. Therefore, the blood unfortunately remains in the base portion in some cases. Therefore, there has been a case where the collected blood cannot be used entirely. Therefore, final measurement accuracy might be lowered.

An object of the present invention to provide a measurement tool and a liquid feeding method in the measurement tool, in which loss of a quantitatively collected liquid sample is unlikely to occur and measurement accuracy may be improved.

Means for Solving the Problems

A measurement tool according to the present invention is provided with a measurement tool body including a sample collection unit that collects a liquid sample by a capillary phenomenon and a liquid feeding channel, and a lid body attachable to and detachable from the measurement tool body, in which the liquid feeding channel includes an upstream side channel and a downstream side channel, a space is provided into which an upstream side end of the sample collection unit and a downstream side end of the upstream side channel open in a state in which the lid body is attached to the measurement tool body, the downstream side channel is connected to a downstream side end of the sample collection unit, and the space is put into an opened state in a state in which the lid body is separated from the measurement tool body, and the space is closed and the upstream side channel and the sample collection unit is connected when the lid body is attached to the measurement tool body.

In the measurement tool according to the present invention, a volume of the space in a state in which the space is closed is preferably smaller than a volume of a liquid supplied to the liquid feeding channel. In this case, it is possible to surely feed the liquid from the upstream side channel to the downstream side channel via the sample collection unit. More preferably, the volume of the space when the lid body is attached and the space is closed is 100 µL or less.

In the measurement tool according to the present invention, a portion in which the sample collection unit opens into the space is preferably located closer to the lid body than a portion in which the upstream side channel opens into the space. In that case, the liquid sample may be more surely collected in the sample collection unit.

In the measurement tool according to the present invention, a reagent storage unit may be provided in the middle of the upstream side channel, and a reagent may be stored in the reagent storage unit.

The measurement tool according to the present invention may further be provided with a pump for feeding a liquid to the upstream side channel.

In another specific aspect of the measurement tool according to the present invention, the measurement tool body includes a first surface and a second surface on a side opposite to the first surface, and the lid body is attached to the measurement tool body from a side of the first surface.

In still another specific aspect of the measurement tool according to the present invention, a first recess is provided on the first surface of the measurement tool body, and when the lid body is attached to the measurement tool body, the space enclosed by the first recess and the lid body is put into a closed state.

In still another specific aspect of the measurement tool according to the present invention, the upstream side channel opens into a bottom surface of the first recess.

In the present invention, the sample collection unit preferably opens into the first surface of the measurement tool body. In this case, in a state in which the space is opened, the sample collection unit may easily collect a liquid sample by a capillary phenomenon.

In another specific aspect of the measurement tool according to the present invention, the sample collection unit is extended from the first surface side toward the second surface side.

In still another specific aspect of the measurement tool according to the present invention, the measurement tool body is provided with a second recess deeper than the first recess around the first recess, and the lid body includes an insertion portion that fits into the second recess. In this case, it is easy to surely fix the lid body to the measurement tool body.

In still another specific aspect of the measurement tool according to the present invention, the upstream side channel includes a first channel portion that passes between the second recess and the second surface of the measurement tool body, and a second channel portion connected to a downstream side end of the first channel portion and extends in a direction connecting the first surface and the second surface, a downstream side end of the second channel portion opens into the space, and the downstream side channel passes between the second recess and the second surface from the downstream side end of the sample collection unit to be extended out of the second recess.

A liquid feeding method according to the present invention is a liquid feeding method using the measurement tool formed according to the present invention, the liquid feeding method provided with a step of collecting a sample in the sample collection unit by a capillary phenomenon in a state in which the lid body is detached from the measurement tool body, a step of attaching the lid body to the measurement tool body, and putting the space into a closed state so that a channel connecting the upstream side channel and the sample collection unit is formed, and a step of feeding a liquid from the upstream side channel, and allowing the sample and the liquid to flow to the downstream side channel.

Effect of the Invention

According to a measurement tool and a liquid feeding method according to the present invention, a liquid sample quantitatively collected in a sample collection unit is surely fed to a downstream side channel. Therefore, loss of the liquid sample is unlikely to occur and a quantitative collection property is excellent. Therefore, when the liquid sample fed to the downstream side channel is measured, measurement accuracy is unlikely to be deteriorated.

BRIEF DESCRIPTION OF DRAWINGS

FIG. 1 is a perspective view illustrating an outer appearance of a measurement tool according to a first embodiment of the present invention.

FIG. 2 is a cross-sectional view of a portion taken along line A-A of FIG. 1.

FIG. 3 is a front cross-sectional view for explaining a state in which a lid body is separated and a space is put into an opened state in the measurement tool according to the first embodiment.

FIG. 4 is a front cross-sectional view for explaining a state in which a liquid sample is collected in a sample collection unit in the measurement tool of the first embodiment.

FIG. 5 is a perspective view for explaining a sample collection kit of a comparative example.

FIG. 6(a) is a perspective view illustrating a capillary used in a comparative example, and FIG. 6(b) is a perspective view for explaining a disposable tip used in the comparative example.

MODE(S) FOR CARRYING OUT THE INVENTION

Hereinafter, the present invention is clarified by describing specific embodiments of the present invention with reference to the drawings.

FIG. 1 is a perspective view illustrating an outer appearance of a measurement tool according to a first embodiment of the present invention, and FIG. 2 is a cross-sectional view of a portion taken along line A-A of FIG. 1, FIG. 2 illustrates a state in which blood as a liquid sample is collected in a sample collection unit.

A measurement tool 1 is provided with a measurement tool body 2 and a lid body 3 attachable to and detachable from the measurement tool body 2.

A sample collection unit 13 that collects a liquid sample by a capillary phenomenon and a liquid feeding channel are provided in the measurement tool body 2. The liquid feeding channel includes an upstream side channel 11 and a downstream side channel 12.

The upstream side channel 11 and the downstream side channel 12 are micro channels. The micro channel is intended to mean a fine channel in which a micro effect is caused when a fluid is conveyed. In such a micro channel, the fluid is strongly affected by surface tension, and exhibits a behavior different from that of a fluid flowing through normal large-sized channel.

A cross-sectional shape and size of the micro channel are not especially limited as long as the above-described micro effect occurs in the channel. For example, when a pump or gravity is used when allowing a fluid to flow through the micro channel, from a viewpoint of further reducing a channel resistance, when the cross-sectional shape of the micro channel is substantially rectangular (including square), a dimension of a smaller side is preferably 20 μm or more, more preferably 50 μm or more, and still more preferably 100 μm or more. Furthermore, from a viewpoint of further miniaturizing a microfluidic device, this is preferably 5 mm or less, more preferably 1 mm or less, and still more preferably 500 μm or less.

Furthermore, when the cross-sectional shape of the micro channel is substantially circular, a diameter (when this is an ellipse, a minor axis) is preferably 20 μm or more, more preferably 50 μm or more, and still more preferably 100 μm or more. From a viewpoint of further miniaturizing the microfluidic device, the diameter (when this is the ellipse, the minor axis) is preferably 5 mm or less, more preferably 1 mm or less, and still more preferably 500 μm or less.

In contrast, for example, at allowing the fluid to flow through the micro channel, for more effective utilization of the capillary phenomenon, when the cross-sectional shape of the micro channel is substantially rectangular (including square), the dimension of the smaller side is preferably 5 μm or more, more preferably 10 μm or more, and still more preferably 20 μm or more. Furthermore, the dimension of the smaller side is preferably 200 μm or less, and more preferably 100 μm or less.

The measurement tool body 2 is formed by stacking a cover sheet 5 on a substrate 4. The substrate 4 and the cover sheet 5 are made of appropriate materials such as synthetic resin.

The measurement tool body 2 includes a first surface 2a and a second surface 2b on a side opposite to the first surface 2a. The lid body 3 is fixed to the measurement tool body 2 from a side of the first surface 2a.

The lid body 3 may be made of various materials, but is preferably made of an elastic material such as rubber or elastomer.

FIG. 3 is a front cross-sectional view for explaining a state in which the lid body 3 is separated and a space is put into an opened state in the measurement tool 1 according to the first embodiment. The upstream side channel 11 includes a first channel portion 11a and a second channel portion 11b. The first channel portion 11a extends in a direction parallel to a surface direction of the substrate 4. A reagent storage chamber 11c is provided in the middle of the first channel portion 11a. A reagent 6 is arranged in the reagent storage chamber 11c. The reagent 6 is mixed with blood to be described below. The reagent 6 is not especially limited, but a surfactant, a latex solution and the like may be used, for example.

The second channel portion 11b continues to a downstream side of the first channel portion 11a. The second channel portion 11b extends in a direction connecting the first surface 2a and the second surface 2b, that is, in a thickness direction of the substrate 4.

The first surface 2a of the measurement tool body 2 is provided with a first recess 14 and a second recess 15.

With reference to FIG. 2 again, the lid body 3 includes a tubular insertion portion 3a and a flange portion 3b provided on one end of the insertion portion 3a. An outer diameter of the flange portion 3b is made larger than an outer diameter of the insertion portion 3a. The insertion portion 3a is configured to fit into the second recess 15 illustrated in FIG. 3. The lid body 3 includes a top plate portion 3c. The top plate portion 3c is a portion enclosed by the insertion portion 3a. A length of the insertion portion 3a is selected so that there is a gap between a lower surface of the top plate portion 3c and the first surface 2a when the lid body 3 is fixed to the measurement tool body 2. Furthermore, the first recess 14 is provided on a side closer to the first surface 2a than the second recess 15. A diameter of the first recess 14 is made equivalent to the diameter of the flange portion 3b. The sample collection unit 13 opens into the first surface 2a. A downstream side end of the sample collection unit 13 is connected to the downstream side channel 12. A portion where the sample collection unit 13 opens into the first surface 2a projects toward the lid body 3 more than a bottom surface 14a where the second channel portion 11b opens into the recess 14.

The sample collection unit 13 has dimensions enabling collection of a liquid sample such as blood by the capillary phenomenon. A diameter of the sample collection unit 13 is not especially limited, but may be in a range of 0.1 to 2 mm, for example. A length of the sample collection unit 13, that is, the dimension connecting the first surface 2a and the second surface 2b may be selected according to a size of the sample to be collected. For example, this may be a dimension of approximately 1 to 40 mm.

As illustrated in FIG. 2, in a state in which the lid body 3 is attached to the measurement tool body 2, a closed space enclosed by the first recess 14 and the lid body 3 is provided. This space is put into the opened state in a state in which the lid body 3 is separated from the measurement tool body 2. In a state in which the lid body 3 is attached to the measurement tool body 2, the space is closed and the upstream side channel 11 and the sample collection unit 13 are connected.

It is desirable that a volume of the closed space be smaller than a volume of the liquid supplied to the liquid feeding channel. As a result, the space is surely filled with the liquid. Therefore, the liquid may be surely fed to the sample collection unit.

The volume of the space in the closed state is preferably 100 µL or less.

The downstream side channel 12 is connected to the downstream side end of the sample collection unit 13, passes between the second recess 15 and the second surface 2b, and extends outward from the second recess 15.

The downstream side channel 12 is preferably connected to a measurement unit and the like provided in the substrate 4.

The first channel portion 11a is extended between the second recess 15 and the second surface 2b in a direction parallel to the first surface 2a and the second surface 2b. A pump P is connected to the first channel portion 11a of the upstream side channel 11. The pump P may be arranged outside the measurement tool body 2 or may be built in the measurement tool body 2. As the built-in pump, for example, a micro pump using a photosensitive gas generator which generates gas by light irradiation is preferably used.

Next, a blood collecting and liquid feeding method using the measurement tool 1 is described.

In an initial state, the lid body 3 is fixed to the measurement tool body 2. Alternatively, the lid body 3 may be separated from the measurement tool body 2 in advance. When the lid body 3 is fixed to the measurement tool body 2, the lid body 3 is first separated from the measurement tool body 2. As a result, as illustrated in FIG. 3, the sample collection unit 13 is exposed. In this state, a portion opening into the first surface 2a of the sample collection unit 13 is brought into contact with blood. Although not especially limited, the portion opening into the first surface 2a of the sample collection unit 13 is brought into contact with a liquid surface of the blood. As a result, the blood is collected in the sample collection unit 13 by the capillary phenomenon. Therefore, as illustrated in FIG. 4, the sample collection unit 13 is filled with blood A. Therefore, the blood A of an amount corresponding to a volume of the sample collection unit 13 may be accurately collected.

Next, as illustrated in FIG. 2, the lid body 3 is attached to the measurement tool body 2. That is, the lid body 3 is fixed so that the insertion portion 3a fits into the second recess 15. As a result, the space enclosed by the first recess 14 and the lid body 3 is closed. The length of the insertion portion 3a is selected so that there is a gap between the lower surface of the top plate portion 3c of the lid body 3 and the first surface 2a. Therefore, in a state in which the lid body 3 is fixed to the measurement tool body 2, the space is closed, and the second channel portion 11b of the upstream side channel 11 and the sample collection unit 13 are connected to the space. Therefore, the liquid feeding channel including the upstream side channel 11, the sample collection unit 13, and the downstream side channel 12 is formed. In this state, the pump P is driven to feed the liquid from the upstream side channel 11. The liquid may be a liquid that dissolves the reagent 6, or a liquid reagent may be used as the reagent 6 and the reagent 6 may be fed. The liquid reaches the sample collection unit 13 via the upstream side channel 11 and the space. Therefore, the blood A in the sample collection unit 13 reacts with the reagent 6 and is fed to the downstream side channel 12. In this case, the blood A of the amount collected in the sample collection unit 13 is surely reacted with the reagent 6 and fed to the downstream side channel 12. Alternatively, even when the reagent 6 is not used, the blood A of the amount collected in the sample collection unit 13 may be surely recovered.

Therefore, in the measurement tool 1, not only reliable quantitative collection of the liquid sample such as the blood A may be performed, but also an entire amount of the collected liquid sample may be surely used. Therefore, when the measurement or the like is performed in the measurement unit connected to the downstream side channel 12, variation in measurement is small.

Hereinafter, specific example and comparative example are described. Meanwhile, the present invention is not limited to the following example.

EXAMPLE

In a measurement tool body 2 made of polystyrene as a material, a sample collection unit having following dimensions was provided.

Opening diameter of 0.8 mm, length of 2 mm, and volume of 1 µL.

Cross-sectional dimensions of a downstream side channel 12 to be connected were set to 0.5 mm in width×0.5 mm in depth.

Blood was collected in the sample collection unit by a capillary phenomenon. For measurement tools of weights of samples Nos. 1 to 6 in Table 1 below, the blood was collected in the above-described manner, and a blood suction amount was further obtained. As a method, a change in weight before and after the blood collection was measured, and then this was divided by a specific gravity to calculate the blood suction amount. Results thereof are illustrated in following Table 1.

COMPARATIVE EXAMPLE

A blood collection kit 101 illustrated in FIG. 5 was used. The blood collection kit 101 includes a capillary insertion unit 101b and a plate 101a. The plate 101a is provided with the capillary insertion unit 101b and a disposable tip insertion unit 101c. A container 102 is connected to a lower surface of the plate 101a. When sucking blood, a capillary 103 illustrated in FIG. 6(a) is immersed in the blood and the blood is collected by a capillary phenomenon. This capillary 103 is inserted into the capillary insertion unit 101b of the plate 101a, and the blood is taken out into the container 102. Next, the plate 101a is moved to allow the disposable tip insertion unit 101c to be located on the container 102. In this state, a disposable tip 104 is inserted into the container 102 from the disposable tip insertion unit 101c, and the collected blood is taken out. An amount of the blood taken out in this manner was measured. Results thereof are illustrated in following Table 2.

TABLE 1

Example

| Sample No. | Weight of measurement tool | Weight of measurement tool after sample is collected | Weight of collected sample | Volume of collected sample | Volume of recovered sample | Recovery rate |
|---|---|---|---|---|---|---|
| 1 | 5714.90 | 5716.67 | 1.77 | 1.66 μL | 1.51 μL | 90.8% |
| 2 | 5708.73 | 5710.44 | 1.71 | 1.61 μL | 1.44 μL | 89.3% |
| 3 | 5691.42 | 5693.10 | 1.68 | 1.58 μL | 1.46 μL | 92.2% |
| 4 | 5769.58 | 5771.32 | 1.74 | 1.64 μL | 1.51 μL | 91.8% |
| 5 | 5617.84 | 5619.60 | 1.76 | 1.65 μL | 1.43 μL | 86.8% |
| 6 | 5673.94 | 5675.75 | 1.81 | 1.70 μL | 1.46 μL | 86.1% |
| Average |  |  |  |  |  | 89.5% |
| SD |  |  |  |  |  | 2.351 |
| CV |  |  |  |  |  | 2.6% |

TABLE 2

Comparative example

| Sample No. | Weight of disposable tip | Weight of disposable tip after sample is collected | Weight of collected sample | Volume of collected sample | Volume of recovered sample | Recovery rate |
|---|---|---|---|---|---|---|
| 11 | 853.56 | 854.74 | 1.18 | 1.11 μL | 0.80 μL | 71.8% |
| 12 | 852.17 | 853.19 | 1.02 | 0.96 μL | 0.68 μL | 70.8% |
| 13 | 848.83 | 849.86 | 1.03 | 0.97 μL | 0.78 μL | 80.2% |
| 14 | 853.66 | 854.84 | 1.18 | 1.11 μL | 0.89 μL | 80.4% |
| 15 | 848.10 | 849.17 | 1.07 | 1.01 μL | 0.64 μL | 63.2% |
| 16 | 850.98 | 852.04 | 1.06 | 1.00 μL | 0.62 μL | 61.7% |
| Average |  |  |  |  |  | 71.4% |
| SD |  |  |  |  |  | 7.306 |
| CV |  |  |  |  |  | 10.2% |

As is clear from comparison between Tables 1 and 2, it may be understood that, when compared with the comparative example, according to the example, almost entire collected blood amount may be recovered. Furthermore, it may be understood that variation in recovery rate is significantly small in the example as compared with the comparative example.

Meanwhile, in the present invention, the liquid sample is not limited to the blood, and various body fluids, biochemical samples other than body fluids, or liquids for purposes other than biochemistry may also be used.

EXPLANATION OF SYMBOLS

1: Measurement tool
2: Measurement tool body
2a: First surface
2b: Second surface
3: Lid body
3a: Insertion portion
3b: Flange portion
3c: Top plate portion
4: Substrate
5: Cover sheet
6: Reagent
11: Upstream side channel
11a: First channel portion
11b: Second channel portion
11c: Reagent storage chamber
12: Downstream side channel
13: Sample collection unit
14: First recess
14a: Bottom surface
15: Second recess
101: Blood collection kit
101a: Plate
101b: Capillary insertion unit
101c: Disposable tip insertion unit
102: Container
103: Capillary
104: Disposable tip
A: Blood
P: Pump

The invention claimed is:

1. A measurement tool comprising:
a measurement tool body including a sample collection unit for collecting a liquid sample by a capillary phenomenon, and a liquid feed channel; and
a lid body attachable to and detachable from the measurement tool body,
wherein:
the lid body includes a tubular insertion portion;
the tubular insertion portion is configured to fit into a recess defined in the measurement tool body;
the liquid feed channel includes an upstream side channel and a downstream side channel;
a space is defined, into which an upstream side end of the sample collection unit and a downstream side end of the upstream side channel open, in a first state in which the lid body is attached to the measurement tool body;
the downstream side channel is connected to a downstream side end of the sample collection unit; and
the space is open in a second state in which the lid body is separated from the measurement tool body, and the space is closed and the upstream side channel and the sample collection unit are connected in the first state in which the lid body is attached to the measurement tool body.

2. The measurement tool according to claim 1,
wherein a volume of the space in the first state in which the lid body is attached to the measurement tool body is smaller than a volume of a liquid supplied to the liquid feed channel.

3. The measurement tool according to claim 1,
wherein a volume of the space in the first state in which the lid body is attached to the measurement tool body is 100 μL or less.

4. The measurement tool according to claim 1,
wherein, in the first state in which the lid body is attached to the measurement tool body, a portion in which the sample collection unit opens into the space is closer to the lid body than a portion in which the upstream side channel opens into the space.

5. The measurement tool according to claim 1, further comprising
a reagent storage unit in a middle of the upstream side channel,
wherein a reagent is stored in the reagent storage unit.

6. The measurement tool according to claim 1, further comprising
a pump for feeding a liquid to the upstream side channel.

7. The measurement tool according to claim 1,
wherein the measurement tool body includes a first surface and a second surface on a side opposite to the first surface, and the lid body is attached to the measurement tool body from a side of the first surface.

8. The measurement tool according to claim 7,
wherein the recess includes a first recess defined in the first surface of the measurement tool body.

9. The measurement tool according to claim 8,
wherein the upstream side channel opens into a bottom of the first recess.

10. The measurement tool according to claim 9,
wherein the sample collection unit opens into the first surface of the measurement tool body.

11. The measurement tool according to claim 10,
wherein the sample collection unit extends from a first surface side toward a second surface side.

12. The measurement tool according to claim 11,
wherein the recess further includes a second recess which is deeper than the first recess, and the tubular insertion portion fits into the second recess.

13. The measurement tool according to claim 12,
wherein the upstream side channel includes a first channel portion that passes between the second recess and the second surface of the measurement tool body, and a second channel portion connected to a downstream side end of the first channel portion and extends in a direction connecting the first surface of the measurement tool body and the second surface of the measurement tool body, a downstream side end of the second channel portion opens into the space, and the downstream side channel passes between the second recess and the second surface of the measurement tool body from the downstream side end of the sample collection unit so as to extend away from the second recess.

14. A liquid feeding method using the measurement tool according to claim 1, the liquid feeding method comprising:
collecting the liquid sample in the sample collection unit by the capillary phenomenon in the second state in which the lid body is separated from the measurement tool body;
attaching the lid body to the measurement tool body, and closing the space such that a channel connecting the upstream side channel and the sample collection unit is formed; and
feeding a liquid from the upstream side channel, and allowing the liquid sample and the liquid to flow to the downstream side channel.

\* \* \* \* \*